(12) United States Patent
Kim

(10) Patent No.: US 7,281,812 B2
(45) Date of Patent: Oct. 16, 2007

(54) BACKLIGHT UNIT

(75) Inventor: Gi Bin Kim, Kyeongki-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 131 days.

(21) Appl. No.: 11/137,371

(22) Filed: May 26, 2005

(65) Prior Publication Data
US 2005/0265049 A1    Dec. 1, 2005

(30) Foreign Application Priority Data
May 28, 2004    (KR) .............. 10-2004-0038340

(51) Int. Cl.
*G09F 13/04*    (2006.01)
*A47F 3/00*    (2006.01)
(52) U.S. Cl. ..................... 362/97; 362/29; 362/30; 362/294; 362/632
(58) Field of Classification Search .............. 362/97, 362/294, 29, 30, 632
See application file for complete search history.

(56) References Cited

U.S. PATENT DOCUMENTS 6,749,315 B2 *   6/2004   Moon et al. ................ 362/97

2003/0112626 A1   6/2003   Yoo, et al
2003/0227767 A1   12/2003   Lee, et al

FOREIGN PATENT DOCUMENTS

CN    1467548    1/2004

\* cited by examiner

*Primary Examiner*—Sandra O'Shea
*Assistant Examiner*—James W Cranson, Jr.
(74) *Attorney, Agent, or Firm*—McKenna, Long & Aldridge LLP

(57) ABSTRACT

A backlight unit includes: common electrodes for applying a voltage to opposite ends of a plurality of lamps; a lower member for receiving the common electrodes and positioning the common electrodes at the opposite ends of the lamps; upper members for positioning opposite to the common electrodes, each upper member having air inlet/outlets at opposite sides of the upper members and an unobstructed space between two inner side surfaces of the upper members for allowing a free flow of air between the inlet/outlets.

12 Claims, 6 Drawing Sheets

BACKLIGHT UNIT

This application claims the benefit of Korean Application No. P2004-38340 filed on May 28, 2004, which is hereby incorporated by reference as if fully set forth herein.

BACKGROUND OF THE INVENTION

1. Field of the Invention

The present invention relates to providing light for non-self illuminating displays, and more particularly, to a backlight unit.

2. Discussion of the Related Art

In the past, Cathode Ray Tubes (CRTs) were generally used as display devices. For example, CRTs were used in TVs and as monitors in measuring instruments and information terminals. However, a CRT is heavy and has a large size due to the glass tube for generating an image. Consequently, the CRT is not meeting the size and weight requirements in the trend of making electronic products smaller and lighter. The CRT is now being replaced by flat panel devices, such as the Liquid Crystal Display Device (LCD), Plasma Display Panels (PDP), Electro-luminescence Display Device (ELD).

Liquid crystal display devices have been replacing CRTs because they have the advantages of small size, light weight, and low power consumption. Liquid crystal display devices have not only been used as monitors for laptop computers, but also as monitors for desktop computers, and in large screen information display devices, and large screen TVs. Accordingly, demands for the liquid crystal display devices are increasing.

Because liquid crystal display devices are not self-luminous, an external light source is required to display a picture. In general, a backlight unit is used as a light source for the liquid crystal display device. The backlight unit has cylindrical lamps arranged at an edge of the liquid crystal display device or directly under the liquid crystal display device.

The edge-type backlight has a lamp unit mounted at an edge of a light plate that guides the light. The lamp unit of an edge-type backlight is provided with a lamp for emitting the light, a lamp holder at opposite ends of the lamp for holding the lamp, and a reflective plate around an outside circumferential surface of the lamp at a side surface of the light plate for reflecting the light from the lamp toward the light plate. The edge-type backlight is mostly used in a relatively small size liquid crystal display devices, such as a monitor for a laptop computer, or a desktop computer. The edge-type backlight has good light uniformity, a long lifetime, and a thin profile.

The direct-type backlight was developed when the size of the liquid crystal display devices started having display screens larger than 20". The direct-type backlight has a plurality of lamps arranged at regular intervals under a diffusion plate for directing the light toward a front surface of the LCD panel. Since the direct-type backlight has better light efficiency than the edge-type, the direct-type is typically used in large sized liquid crystal display devices.

The direct-type backlight is typically used in liquid crystal display devices, such as a large sized monitor or a TV set, that are used for long periods of time. The direct-type backlight also uses more lamps than an edge-type backlight unit. Thus, the possibility for a lamp failure in the direct-type backlight is greater than for an edge-type backlight. Moreover, in the case of edge-type backlight having the lamp units mounted on opposite edges of the light plate, even if one lamp fails to turn-on, the luminance of the screen drops. However, if one lamp fails in the direct-type, as there are a plurality of lamps mounted on an under of the screen, a portion of the screen where a lamp failed becomes distinctively darker than other portions of the screen. Consequently, replacement of the lamps is desirable in the direct-type backlight and a structure for mounting/dismounting the lamps is also desirable.

A related art backlight unit will be described with reference to the attached drawings. FIG. 1 illustrates a perspective view of a related art direct-type backlight unit, and FIG. 2 illustrates a perspective view showing an inside of an upper member shown in FIG. 1.

Referring to FIGS. 1 and 2, the related art direct below type backlight unit is provided with a plurality of lamps 1 arranged at regular intervals each with external electrodes at opposite ends. A lower member 3 having a plurality of slots at opposite edges receives and supports opposite ends of the lamps 1. A lower reflective plate 4 on the lower member 3 for reflecting light from the lamps 1. Upper members 6 at the opposite to the lower member 3 for holding, and supporting the lamps 1, together with the lower member 3.

The lamps 1 are external electrode florescent lamp (EEFL), and though not shown, the external electrodes at opposite ends of the lamps 1 are connected in common to a common electrode. The upper member 6 for holding the lamps 1 together with the lower member 3 has slots at portions where the lamps 1 are to be placed. There is a rib 8 within the upper member 6. The rib 8 may be provided between each of the lamps 1, or every second, or more than every second lamp. That is, the upper member 6 has an empty space, except for the ribs 8. Further the upper member 6 has air inlet/outlets at opposite ends.

In general, air has a very low thermal conductivity, as low as approximately 0.02 W/mK. The ribs 8 in the upper member 6 disrupt air flow such that the transmission of heat from the electrodes and the common electrode of the lamps 1 to the air. This lack of heat transmission causes hot spots near the electrode portions of the lamps 1. The hot spots cause a drop in optical efficiency in the edge portions of the lamps and thus impairing luminance uniformity of the entire backlight unit. Moreover, despite the air inlet/outlets in the upper member 6, the air has to pass over multiple ends of lamps 1 and go around the ribs before cooling the lamps 1 in the middle of a direct-type backlight. Thus, some lamps may be cooled better than other lamps, which also impairs luminance uniformity of the entire backlight unit. In the related art, cold cathode fluorescent lamps (CCFL) are supported with a lamp holder or the upper member is filled with a solid heat conductive material to improve heat dissipation performance at the electrode portion of the lamps. Such designs are not practicable because the methods cause additional problems, such as increased cost and increased weight.

SUMMARY OF THE INVENTION

Accordingly, the present invention is directed to a backlight unit that substantially obviates one or more problems due to limitations and disadvantages of the related art.

An object of the present invention is to provide a backlight unit which can improve heat dissipation for each lamp in a backlight unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the backlight unit includes: common electrodes for applying a voltage to opposite ends of a plurality of lamps; a lower member for receiving the common electrodes and positioning the common electrodes at the opposite ends of the lamps; upper members for positioning opposite to the common electrodes, each upper member having air inlet/outlets at opposite sides of the upper members and an unobstructed space between two inner side surfaces of the upper members for allowing a free flow of air between the inlet/outlets.

In another aspect, a backlight unit includes: a plurality of lamps arranged at regular intervals, each lamp having electrodes at opposite ends; common electrodes at opposite ends of the lamps for applying a voltage to the opposite ends of the lamps; a lower member under the lamps for receiving the common electrodes; upper members at the opposite ends of the lamps, each upper member having air inlet/outlets at opposite sides of the upper member and three substantially flat inner surfaces and an unobstructed space between two inner side surfaces of the upper member for allowing a free flow of air between the inlet/outlets.

In another aspect, a backlight unit includes: a plurality of lamps arranged at regular intervals, each lamp having electrodes at opposite ends; common electrodes at the opposite ends of the lamps for applying a voltage to the opposite ends of the lamps; a lower member under the lamps for receiving the common electrodes; upper members at the opposite ends of the lamps, each upper member having air inlet/outlets at opposite sides of the upper member and three substantially flat inner surfaces and an unobstructed space between two inner side surfaces of the upper member for allowing a free flow of air between the inlet/outlets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
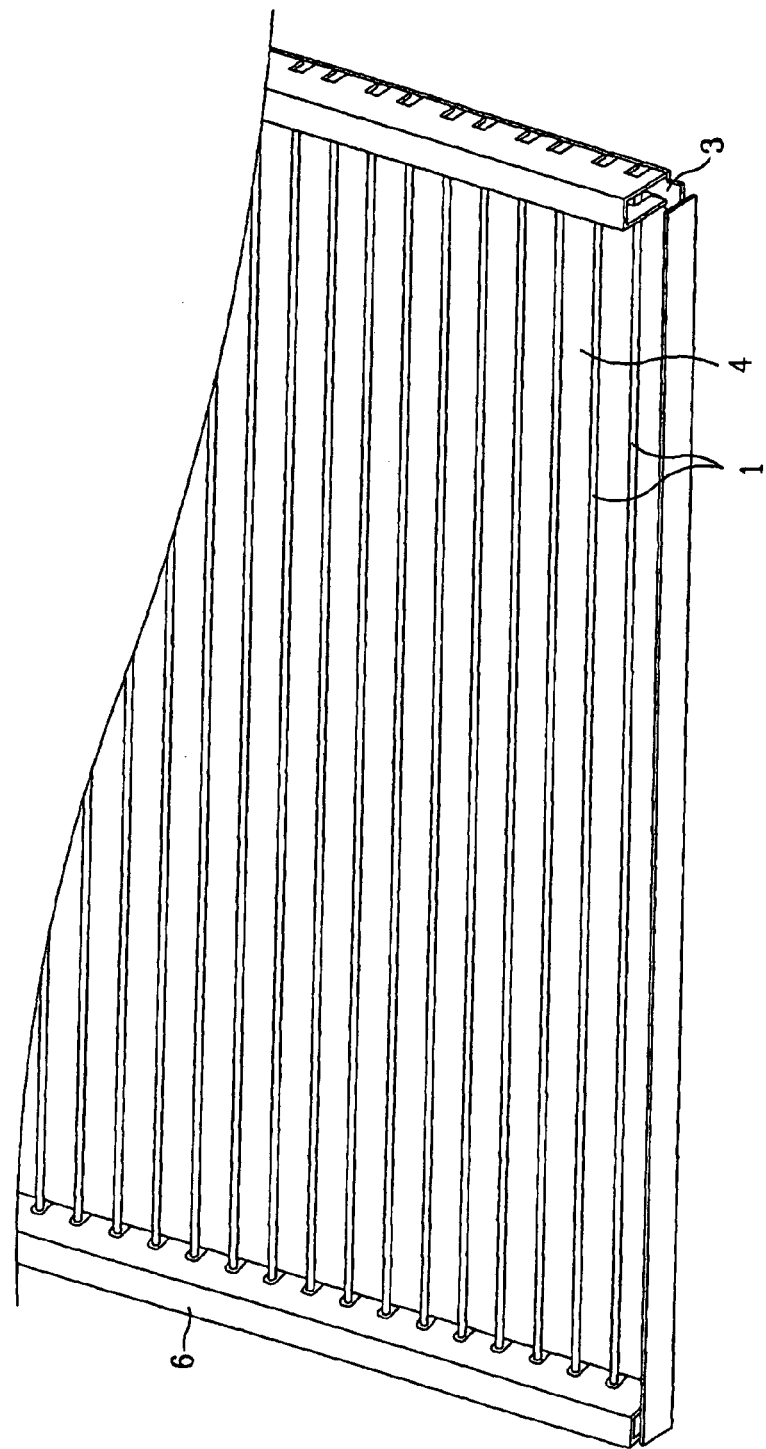
FIG. 1 illustrates a perspective view of a related art direct below type backlight unit.
Figure 2:
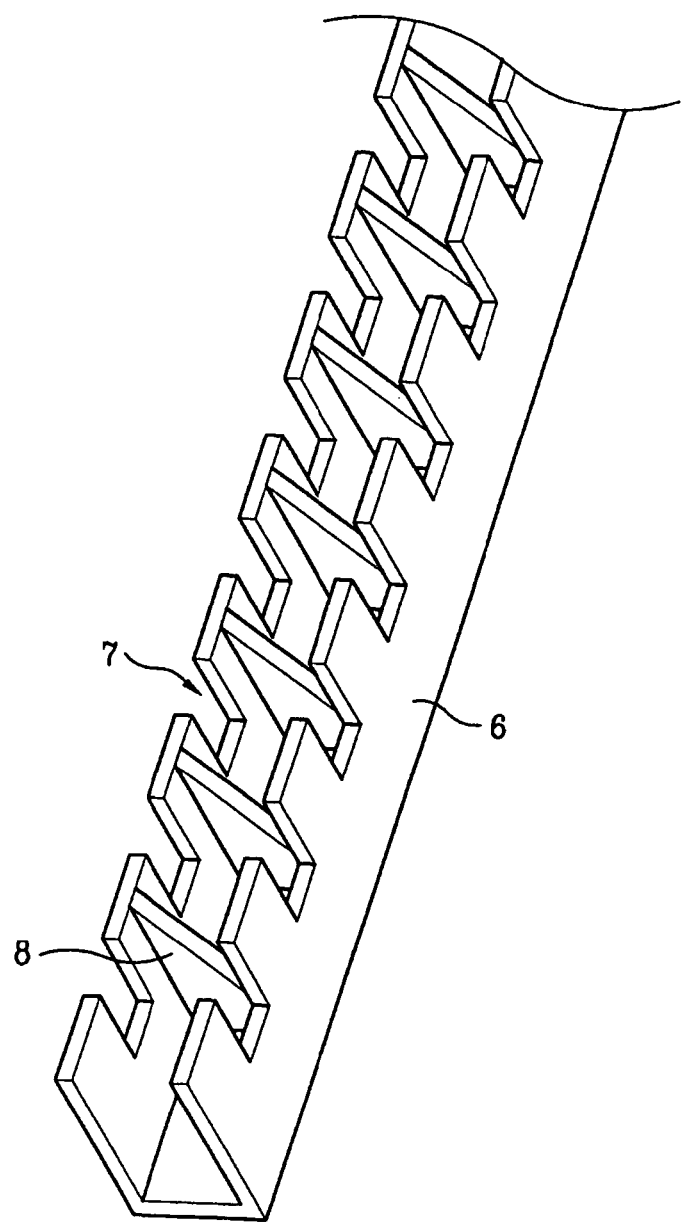
FIG. 2 illustrates a perspective view showing an inside of an upper member in FIG. 1.
Figure 3:
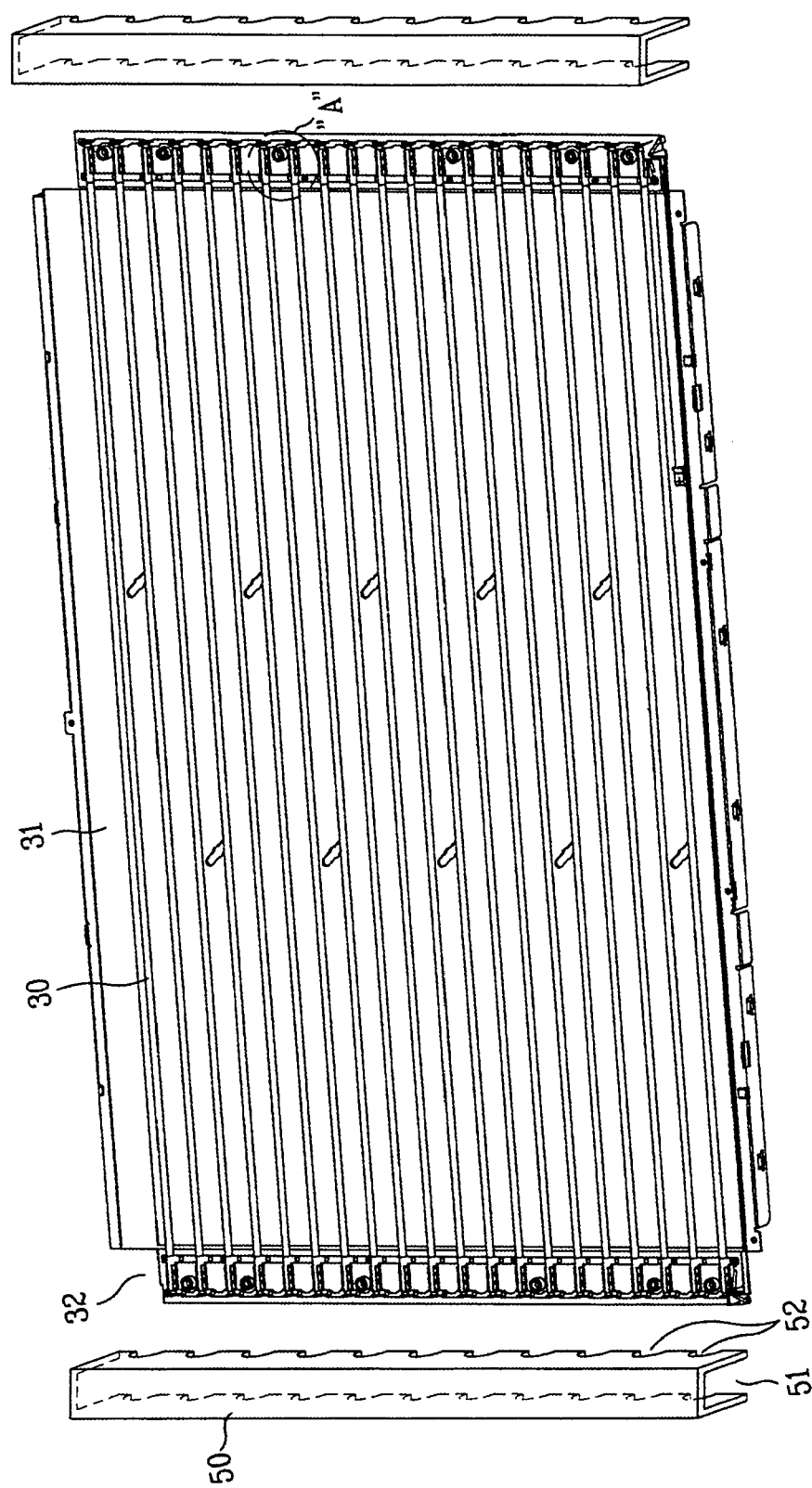
FIG. 3 illustrates a perspective view of a backlight unit in accordance with an embodiment of the present invention before an upper member is mounted.
Figure 4:
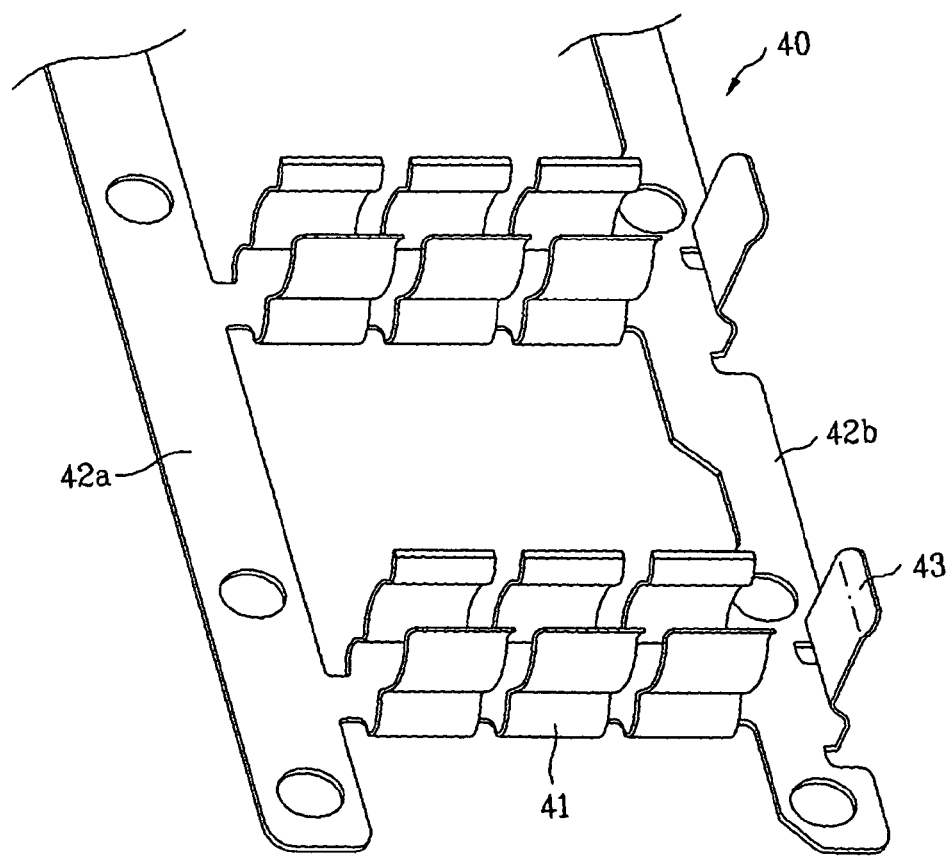
FIG. 4 illustrates an enlarged view of a part 'A' of the common electrode in an embodiment of the present invention.
Figure 5:
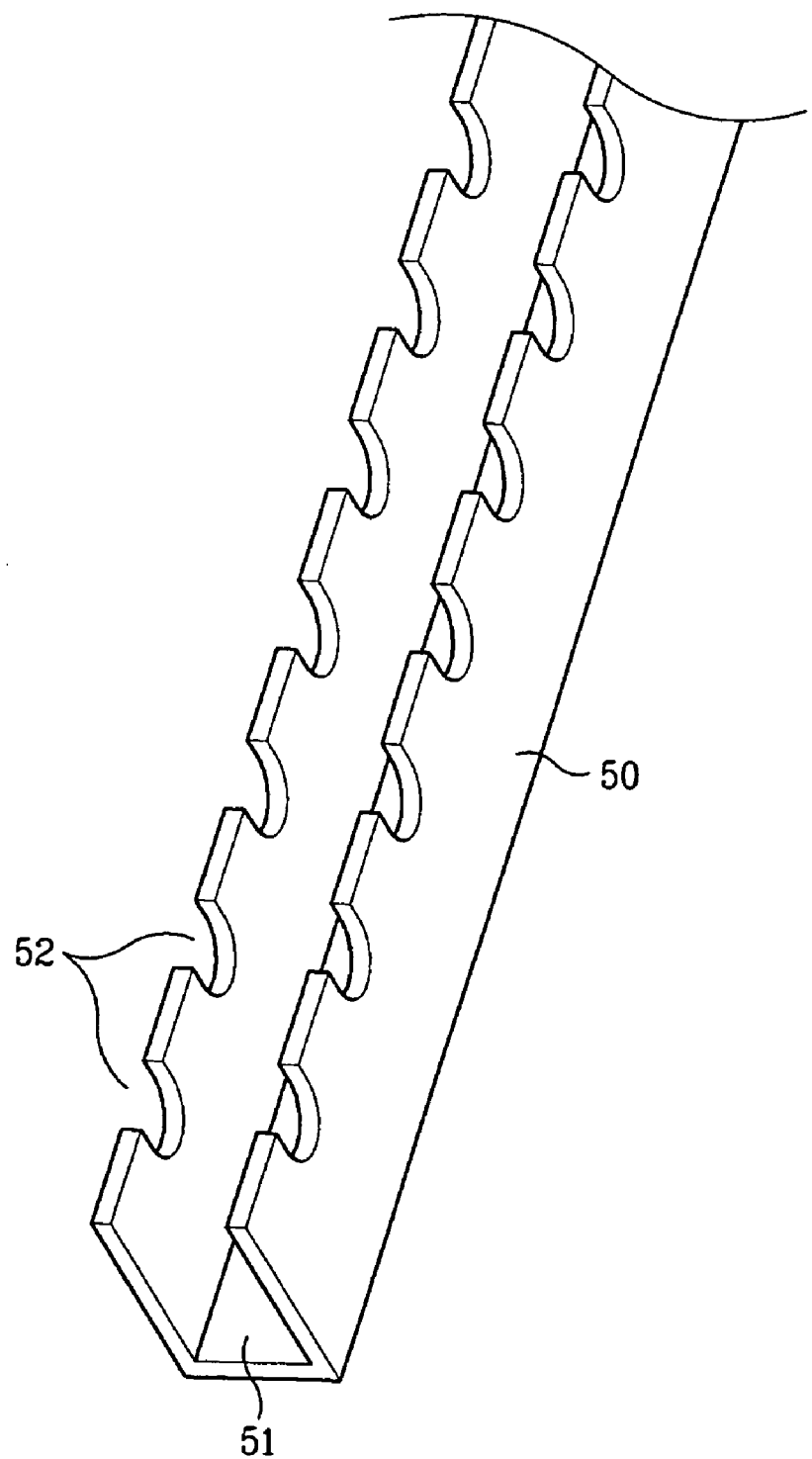
FIG. 5 illustrates a perspective view showing an inside of the upper member in FIG. 3.
Figure 6:
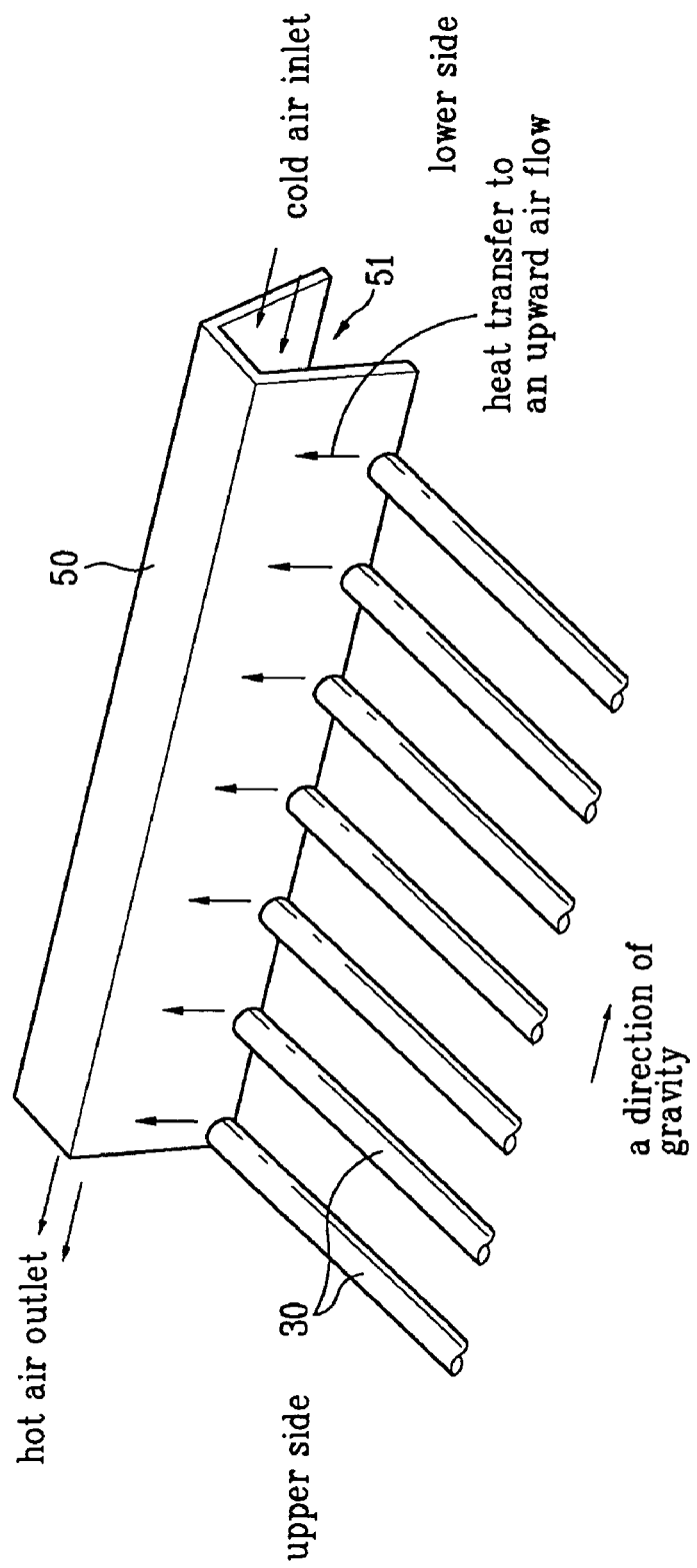
FIG. 6 illustrates diagram showing a heat transfer model of air flow through the upper member in FIG. 3.

FIG. 3 illustrates a perspective view of a backlight unit in accordance with an embodiment of the present invention before an upper member is mounted. FIG. 4 illustrates an enlarged view of part 'A' of the common electrode in an embodiment of the present invention, FIG. 5 illustrates a perspective view showing an inside of the upper member in FIG. 3. FIG. 6 illustrates a diagram showing a heat transfer model of air flow through the upper member.

The backlight unit in accordance with an exemplary embodiment of the present invention, holds and connects external electrode fluorescent lamps with gripper-type common electrodes. The Applicant of the present invention has filed U.S. patent application Ser. No. 10/959,265, which is hereby incorporated by reference in its entirety, and Chinese Patent application No. 200410091462.5 for the gripper-type common electrodes.

Referring to FIGS. 3 and 4, the backlight unit in accordance with an embodiment of the present invention includes a plurality of lamps 30 arranged at regular intervals each lamp having electrodes at opposite ends, gripper-type common electrodes 40 at opposite ends of the lamps 30 for applying a voltage to the opposite ends of the lamps 30 and holding the lamps 30, a lower member 31 under the lamps 30 for receiving the common electrodes 40 and positioning the common electrodes at the opposite ends of the lamps 30, screws (not shown) for fastening the common electrodes 40 to the lower member 31, a wire (not shown) connected to an inverter (not shown) for applying a voltage to the common electrodes 40, and a circular electrode (not shown) formed to surround the screw for connecting the common electrode 40 to the wire connected to the inverter.

Referring to FIG. 4, the common electrode 40 has a plurality of holding portions 41 spaced apart from one another. The holding portion 41 is of a gripper-type that surrounds the lamp 30 and has two slots in the middle. Each of the holding portions 41 having slots for holding the electrodes at the opposite ends of the lamps 30. First and second common electrode lines 42a, and 42b on opposite sides of the holding portions 41 are connected to the holding portions 41. For reference, the second common electrode line 42b is arranged on an outer side of the lower member 31. A stopper 43 upstanding perpendicularly on an edge of the second common electrode line 42b as the stopper for the ends of the lamps 30 to prevent the lamps 30 from being placed to far to one side in mounting the clamps 30. The first and second common electrode lines 42a and 42b have a plurality of holes for screws to fasten the common electrode 40 to the lower member 31. Although not shown, there is an optical spreading structure, such as a diffusion sheet and a diffusion plate, positioned above the lamps 30 for spreading the light from the lamps 30 to generate a uniform light distribution on the display surface of the liquid crystal panel.

In the foregoing backlight unit, the upper members 50 are positioned on the lower member 31 opposite to the common electrodes 30 and the external electrodes of the lamps 30. The upper member 50 has slots 52 at a lower portion. Each of the slots 52 has a shape complementary to the shape of the lamp 30. Air inlet/outlets 51 in the top and bottom sides of the upper member 50 for unobstructed free flow of air through the upper member between the air inlet/outlet 51 in the top and bottom sides of the upper member 50. Since the upper member 50 has no ribs therein, like in the related art, air can flow freely therethrough without resistance. Moreover, four corners of the lower member 31 are cut away where the upper members 50 join such that the cut aways 32 correspond to the air inlet/outlets 51 in the upper members 50.

In general, as the backlight unit is driven, much heat is generated at the electrode portions of the lamps 30 that elevates the temperature of the backlight unit adjacent to these regions. However, the provision of no ribs on the inside of the upper member 50 and the cut aways 32 of the lower member 31 from the upper member 50 at positions corresponding to the air inlet/outlets 51, i.e., if air flow passages are formed in the upper member 50, promotes a strong upward flow is generated by heat convection, as shown in FIG. 6. Thus, there is an unobstructed space between two inner side surfaces of the upper member 50 allowing a free flow of air between the inlet/outlets, such that cool air is introduced into a lower portion through the air inlet/outlet 51, to carry the heat from the lamps 30 and the common electrodes 40 upward, and discharge hot air to an outside of the backlight unit through the air inlet/outlet 51 at the top. Such a heat transfer improves heat dissipation performance of the electrode portions at the opposite ends of the lamps 30 and prevents a temperature rise of the lamps 30 at the common electrodes 40 in driving the backlight unit. The structures of the upper member and the lower member are applicable not only to a backlight unit having the gripper type common electrodes, but also to any one of backlight units that has lamps with electrodes on the outside of the lamp tube and a common electrode.

As has been described, the backlight unit in embodiments of the present invention has the following advantages. The formation of air flow passages having no ribs on an inside of the upper member and cutting away of the lower member from corners of the upper member at positions corresponding to the air inlet/outlets 51 permits improved heat dissipation efficiency at the electrode portions of the lamps. Accordingly, the problem of luminance non-uniformity of the backlight unit caused by the temperature rise at the lamp electrode portions can be prevented.

It will be apparent to those skilled in the art that various modifications and variations can be made in the backlight unit of the present invention without departing from the spirit or scope of the invention. Thus, it is intended that the present invention cover the modifications and variations of this invention provided they come within the scope of the appended claims and their equivalents.

What is claimed is:

1. A backlight unit comprising:
   common electrodes for applying a voltage to opposite ends of a plurality of lamps;
   a lower member for receiving the common electrodes and positioning the common electrodes at the opposite ends of the lamps;
   upper members for positioning opposite to the common electrodes, each upper member having air inlet/outlets at opposite sides of the upper members and an unobstructed space between two inner side surfaces of the upper members for allowing a free flow of air between the inlet/outlets.

2. The backlight unit as claimed in claim 1, wherein the lower member has four corners cut away corresponding to the air inlet/outlets in the upper members.

3. The backlight unit as claimed in claim 1, wherein the upper members have slots in a lower portion complementary to a shape of the lamp.

4. The backlight unit as claimed in claim 1, wherein the common electrode includes:
   a plurality of holding portions spaced from one for holding the electrodes at opposite ends of the lamps;
   first and second common electrode lines on opposite sides of the holding portions for connecting the holding portions;
   a stopper upstanding perpendicularly on an edge of the second common electrode line,
   wherein the first and second common electrode lines have a plurality of holes to fastened the common electrode to the lower member.

5. The backlight unit as claimed in claim 4, wherein the holding portion is a gripper-type surrounding the lamp and having at least two slots in the middle.

6. The backlight unit as claimed in claim 1, further comprising:
   a diffusion sheet and a diffusion plate over the plurality of lamps.

7. A backlight unit comprising:
   a plurality of lamps arranged at regular intervals, each lamp having electrodes at opposite ends;
   common electrodes at opposite ends of the lamps for applying a voltage to the opposite ends of the lamps;
   a lower member under the lamps for receiving the common electrodes;
   upper members at the opposite ends of the lamps, each upper member having air inlet/outlets at opposite sides of the upper member and three substantially flat inner surfaces and an unobstructed space between two inner side surfaces of the upper member for allowing a free flow of air between the inlet/outlets.

8. The backlight unit as claimed in claim 7, wherein the lower member has four corners cut away corresponding to the air inlet/outlets in the upper members.

9. The backlight unit as claimed in claim 7, wherein the upper members have slots in a lower portion complementary to a shape of the lamp.

10. The backlight unit as claimed in claim 7, wherein the common electrode includes:
    a plurality of holding portions spaced from one for holding the electrodes at the opposite ends of the lamps;
    first and second common electrode lines on opposite sides of the holding portions for connecting the holding portions;
    a stopper upstanding perpendicularly on an edge of the second common electrode line,
    wherein the first and second common electrode lines have a plurality of holes to fastened the common electrode to the lower member.

11. The backlight unit as claimed in claim 10, wherein the holding portion is a gripper-type surrounding the lamp and having at least two slots in the middle.

12. The backlight unit as claimed in claim 7, further comprising:
    a diffusion sheet and a diffusion plate over the plurality of lamps.

* * * * *